(12) United States Patent
Schroeder

(10) Patent No.: US 9,099,946 B2
(45) Date of Patent: Aug. 4, 2015

(54) HIGH SPEED FLYWHEEL ON MAGNETIC BEARINGS

(71) Applicant: Ulrich Schroeder, Mont-Saint-Aignan (FR)

(72) Inventor: Ulrich Schroeder, Mont-Saint-Aignan (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 0 days.

(21) Appl. No.: 14/170,018

(22) Filed: Jan. 31, 2014

(65) Prior Publication Data

US 2014/0210424 A1    Jul. 31, 2014

(30) Foreign Application Priority Data

Jan. 31, 2013 (EP) .................... 13305110

(51) Int. Cl.
*F16F 15/12* (2006.01)
*H02K 7/02* (2006.01)
*F16D 49/12* (2006.01)
*F16D 57/00* (2006.01)
*H02P 3/04* (2006.01)
*H02K 7/09* (2006.01)
*F16F 15/30* (2006.01)
*H02K 7/08* (2006.01)
*F16C 32/04* (2006.01)

(52) U.S. Cl.
CPC . *H02P 3/04* (2013.01); *F16F 15/30* (2013.01); *H02K 7/025* (2013.01); *H02K 7/09* (2013.01); *F16C 32/0442* (2013.01); *H02K 7/083* (2013.01); *H02K 2213/06* (2013.01); *Y02E 60/16* (2013.01)

(58) Field of Classification Search
CPC ..... H02K 2213/06; H02K 7/09; H02K 7/025; Y02E 60/16; F16C 32/0442; F16F 15/173; F16F 15/30
USPC ........ 74/572.2, 573.1, 573.13, 574.3; 310/74, 310/90.5; 322/4; 188/72.1, 72.4, 151 R, 188/265, 272, 353
See application file for complete search history.

(56) References Cited

U.S. PATENT DOCUMENTS

| | | | |
|---|---|---|---|
| 5,614,777 A * | 3/1997 | Bitterly et al. | 310/74 |
| 7,051,617 B2 * | 5/2006 | Smith et al. | 74/573.13 |
| 2013/0020157 A1 * | 1/2013 | Scalzo et al. | 188/272 |
| 2014/0125171 A1 * | 5/2014 | Bremer et al. | 310/74 |

FOREIGN PATENT DOCUMENTS

WO    9624981 A1    8/1996

* cited by examiner

*Primary Examiner* — Thomas R Hannon
*Assistant Examiner* — Adam D Rogers
(74) *Attorney, Agent, or Firm* — Bryan Peckjian; SKF USA Inc. Patent Dept.

(57) ABSTRACT

A high speed energy storage flywheel comprises a rotor which is located in a vacuum chamber provided in a stator housing and is supported by magnetic bearings with respect to the stator housing. A fluid tank used for releasing in a controlled manner, a fluid inside the vacuum chamber and therefore create a braking effect on the rotor by friction.

15 Claims, 1 Drawing Sheet

HIGH SPEED FLYWHEEL ON MAGNETIC BEARINGS

CROSS-REFERENCE TO RELATED APPLICATIONS

The present invention claims priority to European Patent Application Number EP13305110.2 filed Jan. 31, 2013, the contents of which are herein fully incorporated by reference.

FIELD OF THE INVENTION

The present invention relates to a high speed energy storage flywheel system comprising a rotor which is located in a vacuum chamber provided in a stator housing and is supported by magnetic bearings with respect to the stator housing.

BACKGROUND OF THE INVENTION

High speed kinetic energy storage flywheel systems provide fast electrical power for load levelling and peak shaving, in competition with battery based systems.

Typically, such an energy storage flywheel system includes a high speed rotating flywheel (usually made of high strength steel or carbon), an integral motor/generator unit and a power conversion unit (to convert mechanical power to electrical power or conversely to convert electrical power to mechanical power). The stored energy per flywheel is typically up to 10 kWh. The peak power provided by the motor/generator power conversion system can vary between 10 kW and several hundred kW.

For such a flywheel based storage system it is important to maximize operating efficiency:

All rotating components are contained within a vacuum enclosure in order to minimize the windage losses.

The rotating components are advantageously operated contactless on active magnetic bearings. Practically, on a vertically arranged flywheel the total losses of a properly adapted 5-axis magnetic bearing system are less than 100 W.

Applied to a highspeed flywheel, magnetic bearings imply no maintenance, minimum rotor- and bearing losses, no wear, no lubrication and have substantially unlimited lifetime.

However a drawback of such a maximized operating efficiency is a very long unassisted spin down time.

A magnetically levitated flywheel system includes a backup bearing system to support the high speed rotating parts in case of a fault or a failure in the magnetic bearing system. The duration of a spin down in the backup bearings can vary as the generator through the power conversion unit can also be used for faster deceleration. However, as a worst case scenario, an unassisted spin down (i.e. without braking from the generator) in the backup bearings could occur. The unassisted spin down time in the backup bearings is many hours.

SUMMARY OF THE INVENTION

The technical problem to be solved is to provide a system having backup bearings which are able to withstand an unassisted full speed spin down. However a safe backup bearing solution which allows an unassisted spin down of several hours requires a big technical effort and would be very expensive.

According to the invention, it is proposed to introduce means for reducing the spin down time in backup bearings drastically from several hours to some minutes. Thus, when the invention is applied, existing "standard" backup bearing solutions can provide the required protection function and it is not necessary to design expensive "special" reinforced backup bearings.

The invention is defined in the appended claims.

The invention more specifically relates to a high speed energy storage flywheel system comprising a rotor which is located in a vacuum chamber provided in a stator housing and is supported by active magnetic bearings with respect to the stator housing, characterized in that it further comprises a fluid tank and a control device configured for selectively releasing in a controlled manner a fluid inside the vacuum chamber, upon detection of an emergency condition, and therefore selectively creating a braking effect on the rotor by friction.

According to an aspect of the invention, the control device comprises at least one fluid release valve and a valve control device.

According to another aspect of the invention, the control device comprises at least one vacuum valve cooperating with the valve control device and a vacuum pumping system.

Preferably, the magnetic bearings comprise first and second radial active magnetic bearings and an axial active magnetic bearing.

The high speed energy storage flywheel system according to the invention may further comprise an electric motor or an electric generator incorporated within the stator housing.

Advantageously a power conversion unit to convert mechanical power to electrical power or electrical power to mechanical power is associated with the electric motor or electric generator.

The high speed energy storage flywheel system according to the invention comprises first and second backup bearings.

The fluid tank may be a gas tank comprising an inert gas such as nitrogen.

Alternatively, the fluid tank may be a gas tank comprising air.

The fluid tank may be a gas tank comprising a gas having a pressure between 10 mbar and 1000 mbar.

The vacuum chamber may be configured to comprise a vacuum having a residual pressure less than $10^{-4}$ mbar.

The valve control device comprises sensors configured for sensing the emergency condition and an electrically- or mechanically triggered device responsive to the sensors and configured to open the at least one fluid release valve to enable a calibrated gas pressure from the gas tank to penetrate into the vacuum chamber and thus to generate a required fast spin down of the rotor.

The invention further relates to a high speed energy storage flywheel method comprising rotating a rotor in a vacuum chamber provided in a stator housing, the rotor being supported by active magnetic bearings with respect to the stator housing, characterized in that it further comprises detecting an emergency condition where the magnetic bearings become faulty or deactivated and releasing in a controlled manner inside the vacuum chamber a fluid from a fluid tank and therefore selectively creating a braking effect on the rotor by friction.

According to an aspect of the invention, the rotor is associated with an electric motor or an electric generator incorporated within the stator housing and the method further comprises the step of power converting mechanical power to electrical power or electrical power to mechanical power with the electric motor or electric generator when the emergency condition is detected.

According to another aspect of the invention, the method comprises sensing the emergency condition and in response to the sensing operation electrically- or mechanically triggering the opening of at least one fluid release valve to enable a calibrated gas pressure from the gas tank to penetrate into the vacuum chamber and thus to generate a required fast spin down of the rotor.

DESCRIPTION OF THE PREFERRED EMBODIMENTS

The present invention will be described in connection with preferred embodiments which are given by way of examples.

Figure 1:
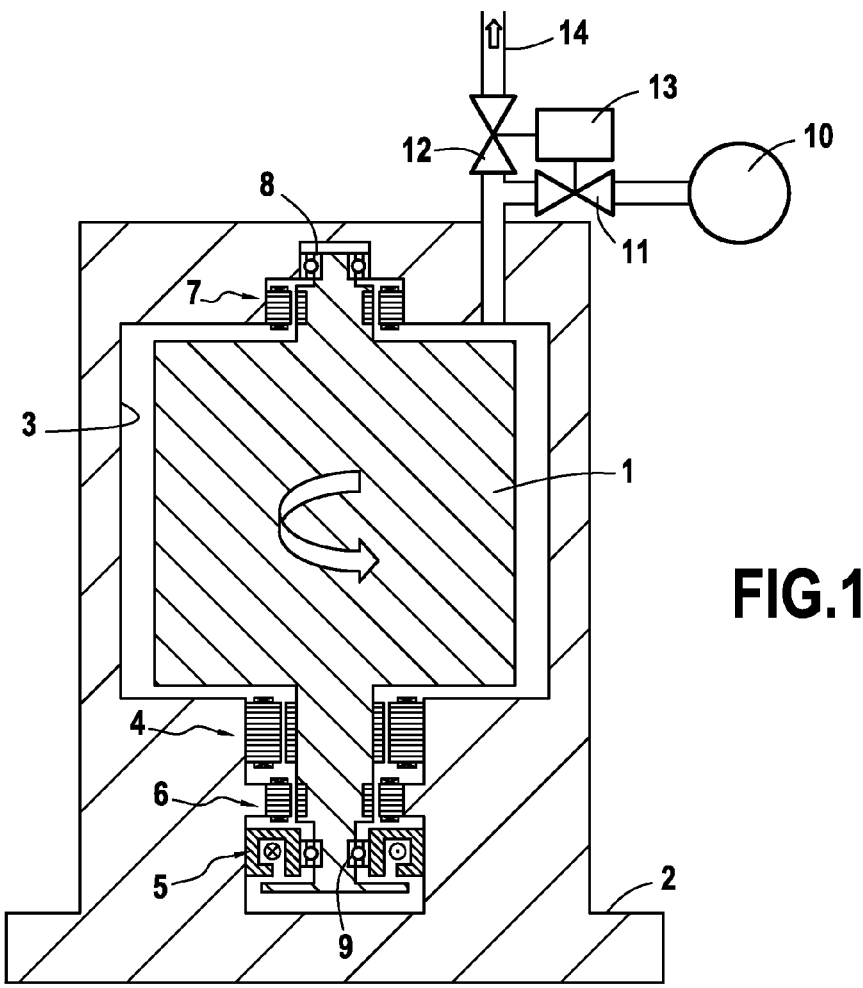
FIG. 1 is a schematic longitudinal sectional view of a high speed energy storage flywheel according to an embodiment of the invention.

FIG. 1 shows a typical arrangement of a storage flywheel according to the invention, which can be for example a 5 kWh storage flywheel.

The storage flywheel comprises a rotating flywheel body (rotor) 1 and a stator housing 2 defining a vacuum chamber 3 within which the rotating flywheel body 1 is located.

In the example shown in FIG. 1, the rotating flywheel body 1 is vertically arranged and is supported by a lower radial active magnetic bearing 6 and an upper radial active magnetic bearing 7 as well as an axial active magnetic bearing 5. For the sake of clarity the sensors and the control circuits associated with the magnetic bearings in a conventional manner to define a 5-axis suspension are not represented in FIG. 1.

The storage flywheel further comprises an integrated motor/generator 4 which may rotate the flywheel body 1 at high speed. The integrated motor/generator 4 increases rotor energy when it acts as a motor and removes energy from the rotor when it acts as a generator.

A conventional radial upper backup bearing 8 and a conventional radial/axial lower backup bearing 9 are arranged to avoid damaging the magnetic bearings in case of failure of the power supply of the magnetic bearings.

In FIG. 1 reference 10 designates a gas tank which preferably contains an inert gas such as nitrogen, or possibly air, under a pressure between 10 mbar and 1000 mbar and preferably about 100 mbar. The gas tank is connected to the vacuum chamber 3 through a gas release valve 11 which is controlled by a valve control unit 13. The valve control unit 13 further controls a vacuum valve 12 located between the vacuum chamber 3 and a vacuum pumping system 14.

According to the present invention, means are provided for detecting an emergency situation by inbuilt means of the valve control unit 13. Such detection means may include one or several electrical, optical or mechanical sensors cooperating with the magnetic bearings and/or the backup bearings.

For example such sensor may detect a backup bearing contact and deliver a signal to the valve control unit 13. In response thereto the valve control unit 13 closes the vacuum valve 12 to isolate the flywheel rotating body 1 from the vacuum pumping system 14. Substantially simultaneously or subsequently the valve control unit 13 triggers the opening of the gas release valve 11 to introduce a calibrated amount of nitrogen (or of another inert gas, or of air) from the gas tank 10 into the containment of the flywheel body 1.

The gas tank 10 is advantageously located inside the vacuum of the flywheel containment. According to the invention, in emergency conditions, an electrically- or mechanically triggered device 11, 12, 13 opens the communication between the gas tank 10 and the vacuum chamber 3 for fast spin down of the rotating flywheel body 1.

The proposed braking method reduces the non-assisted spin down time in backup bearings 8, 9 from hours to minutes. It also allows to use a more "standard" and less expensive backup bearing system 8, 9. Use of inert gas such as nitrogen improves the safety of the system in fault conditions.

It is to be noted that in the critical upper speed range the possible braking torque/power generated by the gas friction depends on the gas pressure rate, the rotating surface and the surface speed. The discussed arrangement is very energy efficient. Thus when the flywheel is operated at full speed in very high vacuum of about $10^{-4}$ mbar the typical amount of gas friction losses is about 100 W. When nitrogen with a pressure rate of about 100 mbar is released into the vacuum chamber 3, the gas friction losses increase to about 100 kW. The stored kinetic energy (about 5 kWh in a typical case) is transferred as thermal energy to the flywheel containment, which induces a temperature increase.

Figure 2:
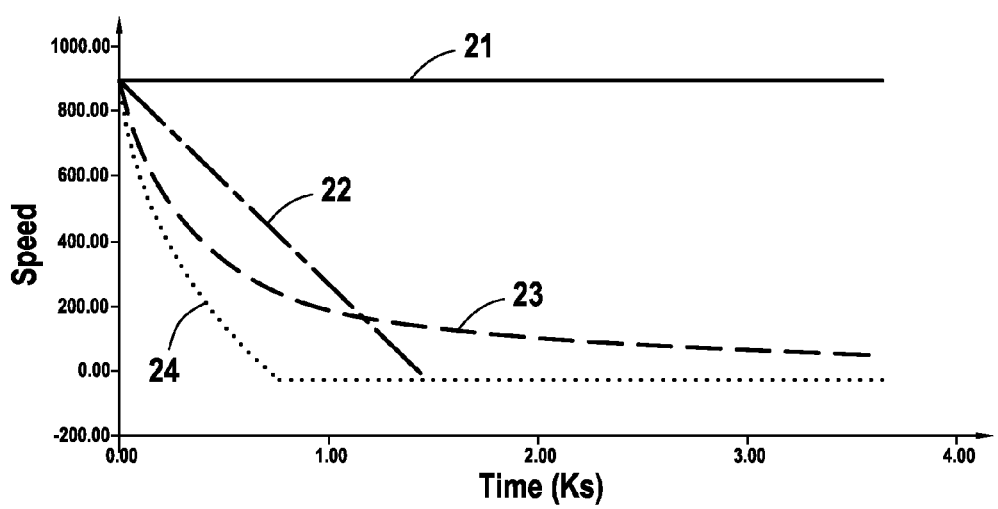
FIG. 2 illustrates the flywheel speed as a function of time in a spin down process for four different cases.

As a typical example, FIG. 2 shows curves 21 to 24 illustrating the flywheel speed as a function of time during a spin down operation for four examples:

Example 1 (curve 21) corresponds to a spin down in high vacuum with no assistance by the inbuilt generator system (which constitutes the worst case scenario). In such a case, the components 10 to 13 of the present invention are not used.

Example 2 (curve 22) corresponds to a spin down in high vacuum and with an assistance by the inbuilt generator system. In such a case, the components 10 to 13 of the present invention are not used.

Example 3 (curve 23) corresponds to a spin down with released nitrogen using the components 10 to 13 of the present invention and with no assistance by the inbuilt generator system (which constitutes the worst case scenario).

Example 4 (curve 24) corresponds to a spin down with released nitrogen using the components 10 to 13 of the present invention and in addition with an assistance by the inbuilt generator system.

It may be easily seen that in example 1 the spin down process is excessively long and even in example 2 the spin down process cannot be achieved in a few minutes. By contrast examples 3 and 4 where the invention is put into practice enable a very fast spin down operation even in the worst case scenario of curve 23.

It may be noted that the spin down rate (−df/dt) by gas friction is not constant. In the upper speed range it is very fast and in the lower speed range it is quite low. In the sketched example, the speed reaches 20% of the nominal speed in about 25 minutes. At 20% of the nominal speed 96% of the kinetic energy has already been transferred. A rotation in the backup bearings with speed below 20% of the nominal speed is less time critical. However, if necessary it is possible to increase the gas pressure rate as a function of speed and so increase the −df/dt in the lower speed range further.

The invention, which may be applied to all types of high speed energy storage flywheels on magnetic bearings, permits to avoid a long spin down time on the backup bearings in an emergency situation. The fast spin down is achieved by a calibrated fluid inlet.

Although preferred embodiments have been shown and described, it should be understood that any changes and modifications may be made therein without departing from the scope of the invention as defined in the appended claims. Thus although an inert gas may be deemed a preferred medium to cause the desired braking effect in case of emergency, a liquid could also be used as a fluid capable of producing a braking effect in the vacuum chamber in case of emergency.

Furthermore although the invention may be applied to a 5-axis magnetic suspension, it may also be applied to a rotating flywheel body supported by a combination of active magnetic bearings (controlled electromagnets) and passive magnetic bearings (permanent magnets).

The invention may be applied to vertical rotating flywheel bodies as well as horizontal rotating flywheel bodies.

The invention claimed is:

1. A high speed energy storage flywheel system comprising:
    a rotor located in a vacuum chamber disposed in a stator housing and supported by active magnetic bearings,
    at least one vacuum valve disposed in fluid communication with the vacuum chamber; and
    a fluid tank and a control device configured for selectively releasing a fluid inside the vacuum chamber upon detection of an emergency condition and then selectively creating a braking effect on the rotor by friction; wherein the control device maintains the at least one vacuum valve in a closed position when the fluid is released inside the vacuum chamber from the fluid tank so that the fluid is prevented from leaving the vacuum chamber during the braking effect.

2. The high speed energy storage flywheel system according to claim 1, wherein the control device further comprises at least one fluid release valve and a valve control device.

3. The high speed energy storage flywheel system according to claim 2, wherein the fluid tank is fluidly connected to the vacuum chamber at a location between the vacuum chamber and the at least one vacuum valve.

4. The high speed energy storage flywheel system according to claim 2, wherein the active magnetic bearings further comprise first and second radial active magnetic bearings and an axial active magnetic bearing.

5. The high speed energy storage flywheel system according to claim 4, further comprising one of an electric motor and an electric generator incorporated within the stator housing.

6. The high speed energy storage flywheel system according to claim 5, further comprising first and second backup bearings.

7. The high speed energy storage flywheel system according to claim 6, wherein the fluid tank is a gas tank comprising an inert gas.

8. The high speed energy storage flywheel system according to claim 6, wherein the fluid tank is a gas tank comprising air.

9. The high speed energy storage flywheel system according to claim 5, wherein the electric motor or electric generator are configured to convert mechanical power to electrical power or electrical power to mechanical power.

10. The high speed energy storage flywheel system according to claim 9, wherein the fluid tank is a gas tank comprising a gas having a pressure between 10 mbar and 1000 mbar.

11. The high speed energy storage flywheel system according to claim 10, wherein the vacuum chamber is configured to provide a vacuum having a residual pressure less than $10^{-4}$ mbar.

12. The high speed energy storage flywheel system according to claim 11, wherein the valve control device is configured for sensing emergency conditions and is configured to open the at least one fluid release valve to enable a calibrated gas pressure from the gas tank to penetrate into the vacuum chamber and thus to generate a required spin down of the rotor.

13. A method of operating a high speed energy storage flywheel comprising:
    rotating a rotor in a vacuum chamber disposed in a stator housing, the rotor being supported by active magnetic bearings with respect to the stator housing,
    providing at least one vacuum valve disposed in fluid communication with the vacuum chamber;
    detecting an emergency condition where the active magnetic bearings become faulty or deactivated, and
    releasing inside the vacuum chamber a fluid from a fluid tank and therefore selectively creating a braking effect on the rotor by friction,
    maintaining the at least one vacuum valve in a closed position when the fluid is released inside the vacuum chamber from the fluid tank so that the fluid is prevented from leaving the vacuum chamber during the braking effect.

14. The method according to claim 13, wherein the rotor is associated with one of an electric motor and an electric generator incorporated within the stator housing, and
    converting mechanical power to electrical power or electrical power to mechanical power with one of the electric motor and electric generator when the emergency condition is detected.

15. The method according to claim 14, further comprising:
    sensing the emergency condition, and
    electrically or mechanically triggering in response to the sensing operation the opening of at least one fluid release valve to enable a calibrated fluid pressure from the fluid tank to penetrate into the vacuum chamber to generate a required spin down of the rotor.

* * * * *